United States Patent [19]

Müllenberg

[11] 4,294,562
[45] Oct. 13, 1981

[54] POLYGON CONNECTION OF A HUB WITH A SHAFT

[76] Inventor: Ralph Müllenberg, Im Wiesengrund 6, 4048 Grevenbroich 12, Fed. Rep. of Germany

[21] Appl. No.: 171,484

[22] Filed: Jul. 23, 1980

[30] Foreign Application Priority Data

Jul. 24, 1979 [DE] Fed. Rep. of Germany ....... 2929908

[51] Int. Cl.³ .............................................. F16D 1/06
[52] U.S. Cl. .................................................. 403/383
[58] Field of Search ............... 403/350, 351, 366, 383, 403/370, 356; 192/44

[56] References Cited

U.S. PATENT DOCUMENTS

| | | | |
|---|---|---|---|
| 3,434,369 | 3/1969 | Runkle | 403/350 X |
| 3,473,406 | 10/1969 | Runkle | 403/351 X |
| 3,850,538 | 11/1974 | Hachtmann | 403/350 |
| 4,105,343 | 8/1978 | Riegler | 403/356 X |

FOREIGN PATENT DOCUMENTS 1405715 9/1975 United Kingdom ............... 403/370

*Primary Examiner*—Andrew V. Kundrat
*Attorney, Agent, or Firm*—Schwartz, Jeffery, Schwaab, Mack, Blumenthal & Koch

[57] ABSTRACT

A polygonal connection for joining a hub with a shaft includes a bore in the hub and a joining portion on the shaft. In one embodiment both the bore and joining portion have mating, non-circular polygonal cross sections. In that embodiment, radially expandable fasteners are located in the vicinities of corners of the polygonal cross section of the joining portion of the shaft. In another embodiment, the bore in the hub and the joining portion of the shaft have circular cross sections, and at least one radially expandable fastener is located on the circumference of the joining portion of the shaft. In both embodiments, each fastener runs parallel to the axis of the shaft, and the longitudinal axis of each fastener is disposed within the perimeter or circumference of the joining portion of the shaft.

1 Claim, 6 Drawing Figures

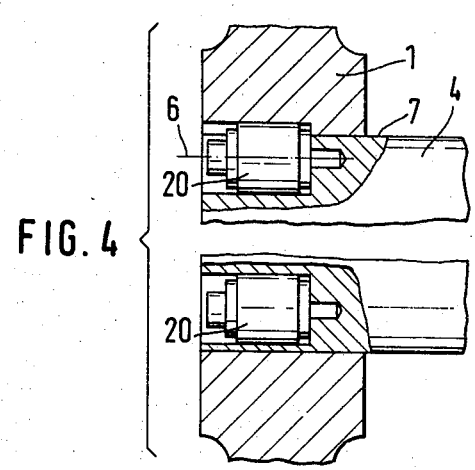
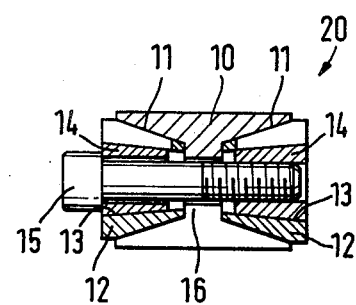
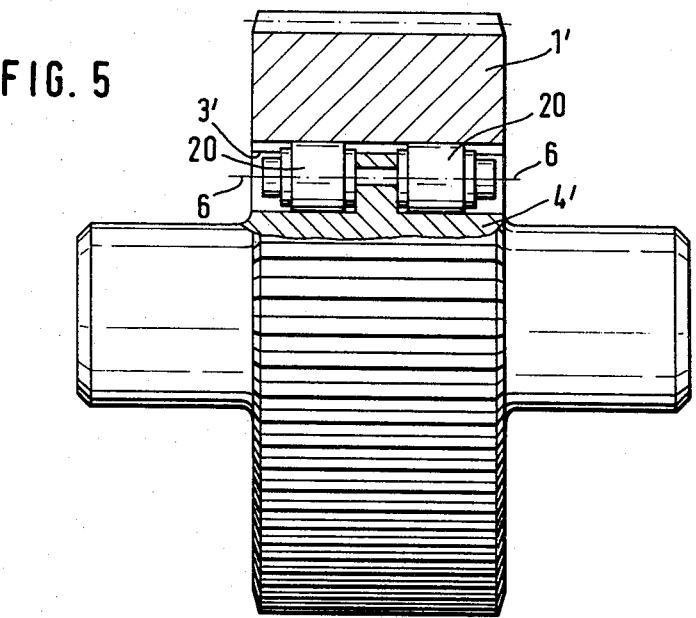

POLYGON CONNECTION OF A HUB WITH A SHAFT

TECHNICAL FIELD OF THE DISCLOSURE

The invention concerns polygon connections of a hub with a shaft of the type in which the shaft as well as a mating bore through the hub are both of non-circular cross section. The invention also concerns hub and shaft connections in which the shaft as well as the mating bore of the hub are both of circular cross section and are connected by means of at least one fastener arranged parallel to the axis of the shaft.

DESCRIPTION OF THE PRIOR ART

Polygon connections of the present type are known for example from the book "Connecting Elements" by Karl-Heinz Decker, published by Karl Hansa Verlag, Munchen, 1963, pages 280–283. Therein the shaft and the hub have cross sections fitting into each other, the cross sections deviating from the circular and having shapes that are convex on all sides and essentially lunar (elliptical), triangular or quadratic. Under strong, alternating stresses, such connections tend to deflect in the vicinity of the corners, where the highest compressive stresses are transmitted.

A similar known connection consists of an arrangement wherein both the shaft and also the bore of the hub are circular in their cross sections, but expandable bolts are inserted in the circumference, parallel to the axis of the shaft. The bolts have their centers located on the circumference of the shaft. They engage the hub with one of their halves and engage the shaft with the other of their halves, thus arresting them with respect to each other. Their deflection behavior is similar to that described in the preceding paragraph.

SUMMARY

It is the object of the invention to reduce the danger of deflection in the above-mentioned connections.

A first solution of the problem, suitable for polygon connections wherein both the hub and the shaft have non-circular cross sections will now be described. The connection, in addition to the bore of non-circular cross section in the hub also includes a joining portion of non-circular cross section shaft, the joining portion of the shaft sitting within the bore. The non-circular cross sections of the bore and of the joining portion of the shaft approximately correspond with each other in size and shape. These non-circular cross sections are taken in planes normal to the axes of the hub and shaft. The joining portion of the shaft has a perimeter defining the non-circular cross section of such joining portion. The non-circular cross section of the joining portion of the shaft also is so configured as to define a plurality of corners at the perimeter of the joining portion. The connection includes a plurality of fasteners disposed in the vicinities of the corners of the joining portions of the shaft, so that each corner has a fastener associated therewith. The fasteners extend in directions parallel to the axis of the shaft. Each fastener includes means for effecting radial expansion thereof, and the fasteners have longitudanal axes located within the perimeter of the joining portion of the shaft.

The action of this arrangement is based on the addition of frictional contact to the purely positive form fit present in the known forms of embodiment of non-circular connections. Such frictional contact prevents the minimal displacements of the shaft with respect to the hub, which minimal deflections may lead up to substantial displacements and substantial stresses. It is essential for this purpose to locate the axis of the expandable bolt within the perimeter of the shaft of shaft joining portion, so that, during the expansion, the peripheral areas of the shaft are urged outwardly, thus engaging the bore of the hub.

The foregoing solution for polygon connections in which the hub and shaft have non-circular cross sections may be embodied in at least two different ways. One way entails disposition of the fasteners entirely within the perimeter of the joining portion of the shaft. Another way involves an arrangement wherein a part of each fastener projects outwardly beyond the perimeter of the joining portion of the shaft and into mating engagement with corresponding recesses in the bore of the hub.

For the other aspect of the invention, whereby the hub bore and the shaft or shaft joining portion have circular cross sections and are connected by means of expandable fasteners in the form of generally cylindrical bolts arranged on the circumference of the shaft, the solution according to the invention will now be briefly described. Of course, the joining portion of the shaft fits within the bore of the hub, and the circular cross sections of the bore and shaft joining portion are taken in planes normal to the axes of the hub and shaft. The joining portion of the shaft has a circumference defining the circular cross section thereof. The fastening is accomplished by at least one fastener or bolt disposed in parallel relationship to the axis of the shaft and on the circumference of the shaft joining portion. The fastener extends into both the hub and the joining portion of the shaft, the fastener having a longitudinal axis located radially within the circumference of the joining portion of the shaft. The fastener includes a means for effecting radial expansion thereof.

Here again, the fact that the peripheral areas of the shaft adjacent to the bolt are radially expanded, thus superposing frictional contact on the form fit of the connection, contributes to the effectiveness of the arrangement of the present invention.

An important aspect of the invention resides in the fact that shaft-hub connections not only may be designed originally in the manner of the invention, but also may have the bolts of the invention added later to connections that are endangered by deflection, so that they may be reinforced.

BRIEF DESCRIPTION OF THE DRAWING

In the drawing, exemplary embodiments of the invention are represented.

FIGS. 4 and 5 show longitudinal sections through different applications;

FIG. 6 shows a longitudinal section through an expandable bolt usable in the invention.

DETAILED DESCRIPTION

Figure 1:
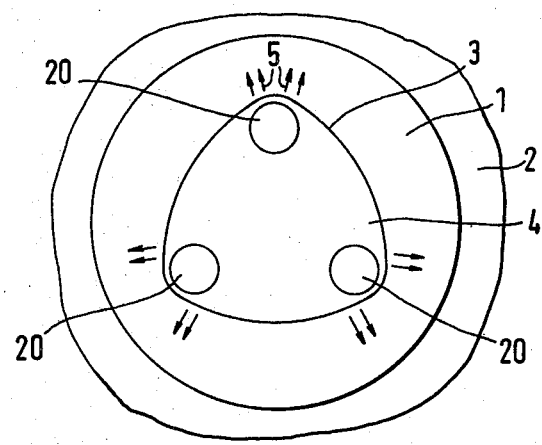
FIGS. 1 to 3 show front elevations of different forms of embodiment of connections according to the present invention.

In FIG. 1 a hub 1 is represented, which is located on a gear 2 or a similar structural part. Hub 1 has a bore 3 with a generally triangular cross section composed of circular arcs. By means of this bore 3, the hub 1 rests on a suitably designed shaft 4, shaft journal or joining portion which fits into the bore 3 and which has a shape corresponding to that of the bore 3.

In the vicinity of the three corners of the shaft 4, defined by the generally triangular cross section of the shaft, but still entirely within its perimeter, expandable fasteners 20 in the form of bolts are provided in corresponding bores parallel to the axis of the shaft 4. During their expansion, the expandable fasteners 20 urge the areas of the periphery of the shaft 4 located adjacently to the fasteners 20 in the radially outward direction, as indicated by the arrows 5. The external perimeter of the shaft 4 is thereby pressured against the internal circumference of the hub bore 3 under a compressive stress.

Figure 2:
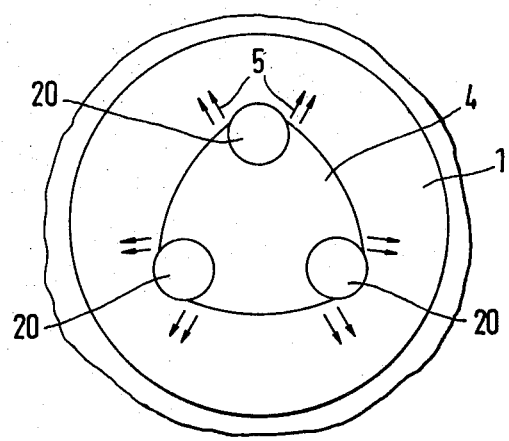

The form of embodiment of FIG. 2 differs from that of FIG. 1 only in that the fasteners 20 project to some extent past the perimeter of the shaft. However, their axes are still within this perimeter, so that in the process of the expansion of the fasteners 20 the peripheral areas of the shaft 4 adjacent to the fasteners 20 are dislocated outwardly in a manner as shown with the arrows 5.

Figure 3:
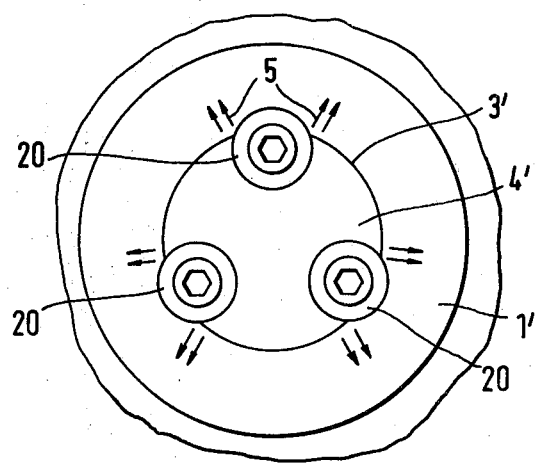

In the exemplary embodiment of FIG. 3, the shaft or shaft portion 4' and the hub bore 3' are circular in cross section. The polygonal connection is effected by means of three fasteners or bolts 20 arranged parallel to the axis of the shaft 4', which fasteners are distributed in regular intervals over the circumference of the shaft 4' and which extend both into shaft 4' and the hub 1'. However, the axes of the fasteners are within the circumference of the shaft 4' so that during the expansion of the fasteners 20, the adjacent areas of the circumference of the shaft 4' are expanded in the direction of the arrows 5, in a manner similar to that in the embodiments of FIGS. 1 and 2.

In FIG. 4, the embodiments of FIGS. 1 and 2 are shown in longitudinal sections. The hub 1 here belongs, for example, to a drum bottom. The shaft 4 is, in its left hand area in FIG. 4, turned or ground into its non-circular form shown in FIGS. 1 and 2. In the upper half, the fastener 20 is arranged in accordance with FIG. 2, i.e., it projects somewhat past the perimeter of the shaft 4. Its axis lies, however, clearly within the perimeter of the shaft 4. In the lower half, the fastener 20 is arranged as per FIG. 1 entirely within the shaft 4 in the region of one of the corners.

The embodiment of FIG. 5 is based on the principle of FIG. 3. The hub 1' is represented by a gear and the shaft 4' by a shaft journal or shaft joining portion somewhat enlarged in its diameter. The shaft journal 4' corresponds in its length to the width of the hub 1. In each case, two bolts are arranged, which penetrate the shaft 4 from different sides. The cross section of the hub bore 3' and also that of the external outermost circumference of the shaft 4' are circular and essentially of the same diameter. The axes 6 of the fasteners 20 are within the external outermost circumference of the shaft 4'.

In FIG. 6 there is shown in detail an exemplary fastener 20 in the form of a generally cylindrical bolt, suitable for the invention. It comprises a sleeve 10 longitudinally slit on one side. Sleeve 10 is provided with conical recesses 11 opposing each other from the two ends. Recesses 11 have half cone angles of 17°, i.e., they are tapered clearly in excess of the self-locking angle. Each conical recess 11 contains a conical ring 12, also with a longitudinal slit and an internal conical passage 13 with a half cone angle of 5°, i.e., clearly less than the self-locking angle. In each conical passage 13 a conical plug 14 is arranged, which is not slit. The conical plug 14 on the left in FIG. 6 has an opening for the lock screw 15 to extend through. The conical plug 14 to the right in FIG. 6 includes a threaded hole which is entered by the lock screw 15. Dimensions are such that, during the tightening of the lock screw, the conical rings 12 initially abut against the inner collar 16 of the conical sleeve 10, and only the conical plugs 14 apply pressure against the surfaces of conical passages 13 with their angles of inclination that are less than the self-locking angle. This results in large radial expansion forces. The release of the lock screw 15 leads to an automatic release along the surfaces of conical recesses 11 of the entire arrangement in view of the surfaces of recess 11 being at an angle which is less than the self-locking angle.

It is obvious that in place of the triangular arrangement shown in the examples of embodiment, other numbers of fasteners 20 distributed over the perimeter or circumference of the hub may be applied and that the fasteners 20 themselves may be of a design different from the one shown in FIG. 6.

What is claimed is:

1. A polygonal connection for joining a hub with a shaft, said hub and shaft each having an axis, the connection comprising:

a bore of non-circular cross section in the hub;

a joining portion of non-circular cross section in the shaft, said joining portion of said shaft fitting within said bore, said non-circular cross sections of said bore and of said joining portion approximately corresponding with each other in size and shape, said non-circular cross sections being taken in planes normal to the axes of the hub and shaft, said joining portion of said shaft having a perimeter defining said non-circular cross section of said joining portion, said joining portion of the shaft being so configured as to define a plurality of corners at said perimeter of said joining portion;

a plurality of fasteners disposed in vicinities of said corners of said joining portion of said shaft, said fasteners extending in directions parallel to the axis of the shaft; each fastener including means for effecting radial expansion thereof, said fasteners having longitudinal axes located within said perimeter of said joining portion of said shaft;

said fasteners being disposed entirely within said perimeter of said joining portion of said shaft.

* * * * *